US009608879B2

(12) United States Patent
Cartwright et al.

(10) Patent No.: US 9,608,879 B2
(45) Date of Patent: Mar. 28, 2017

(54) METHODS AND APPARATUS TO COLLECT CALL PACKETS IN A COMMUNICATIONS NETWORK

(71) Applicant: AT&T Intellectual Property I, L.P., Atlanta, GA (US)

(72) Inventors: Cory Cartwright, Harwinton, CT (US); Paul A. Raccio, Wallingford, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 93 days.

(21) Appl. No.: 14/558,203

(22) Filed: Dec. 2, 2014

(65) Prior Publication Data

US 2016/0156531 A1    Jun. 2, 2016

(51) Int. Cl.
*H04L 12/26* (2006.01)
*H04L 1/00* (2006.01)

(52) U.S. Cl.
CPC ............ *H04L 43/04* (2013.01); *H04L 1/0061* (2013.01); *H04L 43/062* (2013.01)

(58) Field of Classification Search
CPC ... H04L 43/04; H04L 1/0061; H04L 12/1428; H04L 12/2407; H04L 51/10; H04L 12/2493; H04L 12/5845; H04L 29/06387
USPC .......................................... 370/252; 709/224
See application file for complete search history.

(56) References Cited

U.S. PATENT DOCUMENTS

| | | | |
|---|---|---|---|
| 6,954,789 B2 * | 10/2005 | Dietz | G06F 17/30985 370/392 |
| 7,299,176 B1 * | 11/2007 | Lee | G10L 25/69 704/228 |
| 7,299,282 B2 | 11/2007 | Sarkissian et al. | |
| 8,275,875 B2 | 9/2012 | Pruthi | |
| 2010/0211675 A1 | 8/2010 | Ainali et al. | |
| 2010/0278068 A1 | 11/2010 | Nobert et al. | |
| 2011/0125748 A1 | 5/2011 | Wood et al. | |
| 2011/0125749 A1 * | 5/2011 | Wood | H04L 43/026 707/737 |
| 2012/0092343 A1 | 4/2012 | Pruthi et al. | |

(Continued)

FOREIGN PATENT DOCUMENTS

| | | |
|---|---|---|
| JP | 2005223870 A | 8/2005 |
| WO | 2009038384 A1 | 3/2009 |
| WO | 2014071084 A2 | 5/2014 |

*Primary Examiner* — Kwang B Yao
*Assistant Examiner* — Syed M Bokhari
(74) *Attorney, Agent, or Firm* — Hanley, Flight & Zimmerman, LLC

(57) ABSTRACT

Methods and apparatus to collect call packets in a communications network are disclosed. An example method includes extracting data from packets captured at nodes in a communication network; storing the extracted data in a database in association with the voice data corresponding to the captured packets; searching, in response to a query including information, the extracted data in the database to identify records matching the information; identifying a second record in the database as belonging to a same unique voice call as the first record in the database based on determining that first metadata of the first record matches second metadata of the second record; and returning a first packet corresponding to the first record, a second packet corresponding to the second record, and a third packet comprising voice data corresponding to the same unique voice call in response to the query.

20 Claims, 11 Drawing Sheets

(56) References Cited

U.S. PATENT DOCUMENTS

2013/0212263 A1 8/2013 Breslin et al.
2014/0032748 A1 1/2014 Pruthi et al.

* cited by examiner

| Call Fields | |
|---|---|
| 502 → id | fbc349185d7c56ea36bc |
| 504 → h_ip_src | 0x***e23e1 |
| 506 → h_ip_dest | 0x***fe289 |
| 508 → h_isresponse | 1 |
| 510 → h_responsecode | 200 OK |
| 512 → h_responsetxt | |
| 514 → h_fromIP | 0x***5f3c1 |
| 516 → h_toIP | 0x***ffcdf |
| 518 → h_method | INVITE |
| 520 → h_callID | 57cb5a0-0-5749-147a9-dcdb9-24c54032-efab9 |
| 522 → h_TO | \<sip:4xxxxxxxxx@xxx.xxx.xxx.xxx>;transport=udp;tag=ds-9bc-aa4fda68 |
| 524 → h_TO_number | 4xxxxxxxxx |
| 526 → h_FROM | \<sip:8xxxxxxxxx@xxx.xxx.xxx.xxx>;tag=ea0c340-0-13c4-50022-cccc9-2b53def0-cccc9 |
| 528 → h_FROM_number | 8xxxxxxxxx |
| 530 → h_Pident_num | \<sip:${xxxxxxxxx}> |
| 532 → h_geolocation_num | \<geo:41.879044, -87.635901> |
| 534 → h_Via1_branchID | z9hG4bK-cccc9-31fff3cb-7f264b82 |
| 536 → h_Via2_branchID | z9hG4bK-ccdd1-ef3c43bc-7f154b71 |
| 538 → h_Via3_branchID | 0 |
| 540 → h_filename | xxxxxx.eth1.11_06_14_20-15-00.sip.pcap |
| 542 → timestamp | 1415305037.000324388 |

FIG. 5

| Download | To | From | Time (GMT) | Size (bytes) |
|---|---|---|---|---|
| ☐ ☐ SIP SIP+RTP | 0699421<br><sip:0699421@98.79.226.122;user=phone>;tag=e3240-0-13c4-50022-148ead-527b1e28-148ead | 8565720410<sip:8565720410@98.79.228.60>;tag=ACU-696f-fcc356c5 | Wed Nov 12 17:27:03 2014 | 105K |
| ☐ ☐ SIP SIP+RTP | 12312911<sip:12312911@98.79.227.116;user=phone>;tag=e493b80-0-13c4-5022-950bad-4f135e03-950bad | 6482754190<sip:6482754190@98.79.228.62>;tag=ACU-2261-f676f0a3 | Wed Nov 12 17:27:06 2014 | 111K |
| ☐ ☐ SIP SIP+RTP | ""<sip:9112212341@98.79.238.50>;transport=TCP | ""<sip:8427951 48375@98.79.227.138>;tag=87c480-0-13c4-50022-1492d8-402e03e8-1492d8 | Wed Nov 12 17:27:20 2014 | 4.7M |

FIG. 6

METHODS AND APPARATUS TO COLLECT CALL PACKETS IN A COMMUNICATIONS NETWORK

FIELD OF THE DISCLOSURE

This disclosure relates generally to communication network management and, more particularly, to methods and apparatus to collect call packets in a communications network.

BACKGROUND

Diagnosing causes of problems with real-time communications in a communications network can require extensive resources. Known techniques of diagnosing real-time communications include capturing and analyzing packets at the time they are transmitted through the network. However, if the problem is not consistent, the problem may be difficult to replicate in a cost-effective manner. For instance, if a customer of a communications network experiences intermittent problems, such as echoes occurring on voice calls, the problem may be difficult to replicate using known techniques.

BRIEF DESCRIPTION OF THE DRAWINGS

FIG. 5 is an example packet index that may be stored in the example packet database of FIG. 1.

FIG. 6 is an example table illustrating results of a query of the packet database of FIG. 1 that may be delivered to a requester of the query.

The figures are not to scale. Wherever appropriate, the same reference numbers will be used throughout the drawing(s) and accompanying written description to refer to the same or like parts.

DETAILED DESCRIPTION

Figure 1:
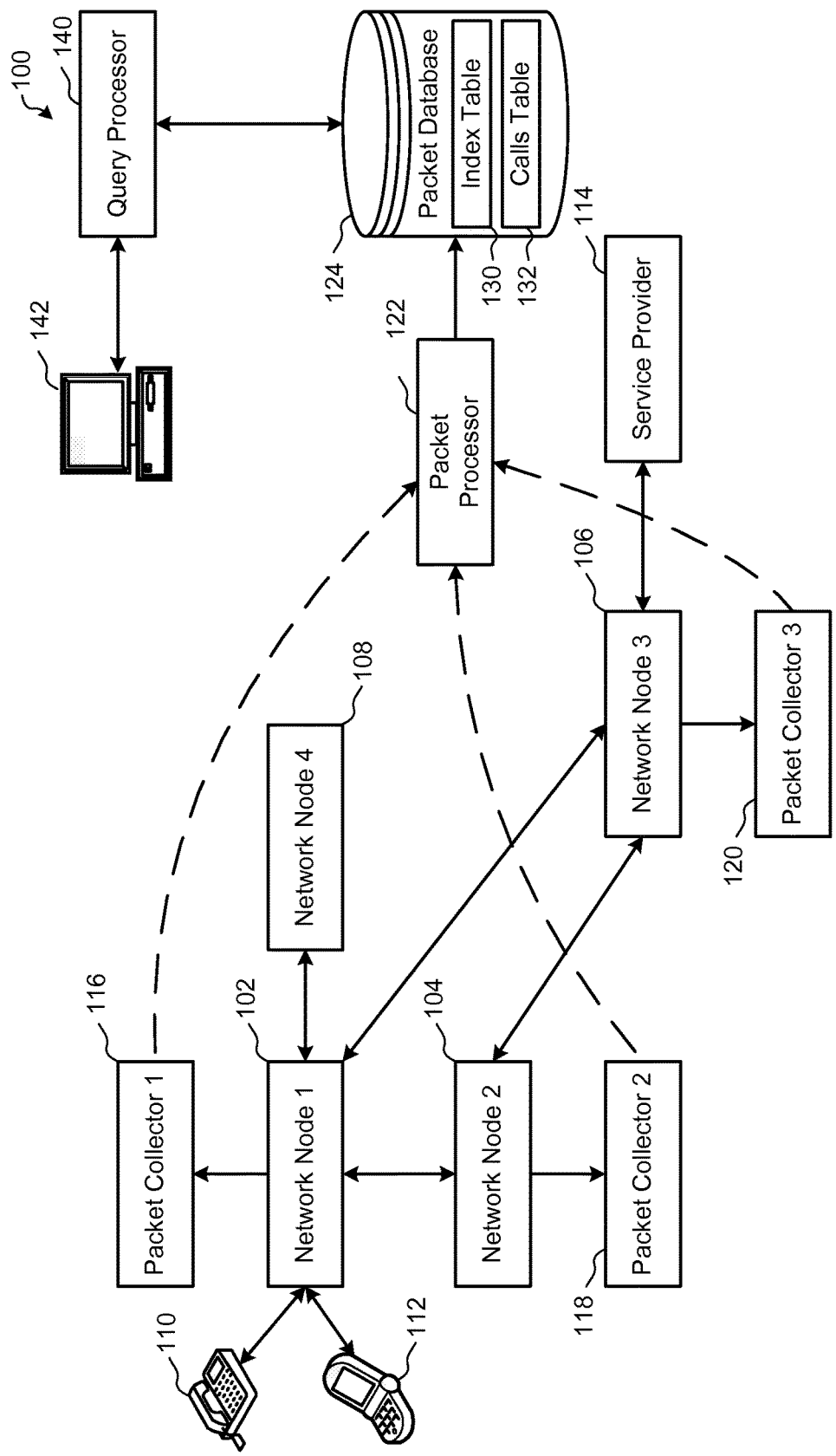
FIG. 1 is a block diagram of an example communication network including packet collection, packet processing, and packet querying to trace an end-to-end communication in accordance with the teachings of this disclosure.

When diagnosing a communications network or data protocol trouble, a packet capture of the data flowing through the network is often useful. In the past, a packet capture required sending a person out to a remote site with special hardware and training. Arranging such a packet capture can be difficult and require coordination that may not be practical and can extend time needed to resolve the problem.

In contrast to known methods of packet capture, example methods and apparatus disclosed herein provide rapid query access to both signaling and voice data occurring on a communications network. Example methods and apparatus provide access to calls occurring in the past to, for example, enable a communications network provider to review communications (e.g., voice and/or video calls) experiencing issues after the fact, when the issues are reported by the customer.

Example methods and apparatus disclosed herein contribute to the field of communications networks by reducing the time and resources required to identify problems with network communications, determine the root causes of such problems, and resolve the problems, thereby freeing network resources for more desirable uses. Furthermore, examples disclosed herein may use commodity hardware to perform packet capture at adequate packet capture rates in even the largest known communications networks. Enabling the use of commodity hardware stands in contrast to specialized packet capture hardware currently in use and reduces the costs of packet capture and storage.

Example methods disclosed herein include extracting data from packets captured at nodes in a communication network. In the example methods, the extracted data includes data representative of voice calls in the communications network and the captured packets comprising control information and voice data. The example methods further include storing the extracted data in a database in association with the voice data corresponding to the captured packets. The example methods further include, in response to a query including information describing a voice call, searching the extracted data in the database to identify records matching the information. The example methods further include, in response to determining that a first record in the database matches the information, identifying a second record in the database as belonging to a same unique voice call as the first record in the database based on determining that first metadata of the first record matches second metadata of the second record. The example methods further include returning a first packet corresponding to the first record, a second packet corresponding to the second record, and a third packet comprising voice data corresponding to the same unique voice call in response to the query.

Example apparatus disclosed herein include a processor and a computer readable storage medium comprising computer readable instructions. When executed by the processor, the instructions cause the processor to perform operations that include extracting data from packets captured at nodes in a communication network. In the example apparatus, the extracted data includes data representative of voice calls in the communications network and the captured packets comprising control information and voice data. The example operations further include storing the extracted data in a database in association with the voice data corresponding to the captured packets. The example operations further include, in response to a query including information describing a voice call, searching the extracted data in the database to identify records matching the information. The example operations further include, in response to determining that a first record in the database matches the information, identifying a second record in the database as belonging to a same unique voice call as the first record in the database based on determining that first metadata of the first record matches second metadata of the second record. The example operations further include returning a first packet corresponding to the first record, a second packet corresponding to the second record, and a third packet comprising voice data corresponding to the same unique voice call in response to the query.

FIG. 1 is a block diagram of an example communication network 100 including packet collection, packet processing, and packet querying to trace an end-to-end communication.

The example communication network 100 of FIG. 1 includes network nodes 102-108 to route traffic within the communication network 100 and/or between the communication network 100 and other communication networks. The communication network 100 may include any number of network nodes 102-108. The example network nodes 102-108 include a combination of routers (e.g., provider edge routers, customer edge routers, border routers, core routers, gateways, etc.), servers (e.g., proxy servers, home subscriber servers, application servers, etc.), and/or any other type(s) of communication network nodes.

The example network nodes 102-108 route communications between different points in the network to achieve communications between devices such as voice over Internet protocol (VoIP) devices, mobile communications devices (which may or may not also be VoIP devices), computers, servers, and/or other communications devices. For example, a first device (e.g., a VoIP telephone 110) and a second device (e.g., a mobile device 112) are connected to the communications network 100 via the network node 102.

The example devices 110, 112 communicate with other entities such as a service provider 114 via the network nodes 102-108. The example service provider 114 may be any device, entity, organization, or network, and accesses the communication network via the network node 106. In the example communication network 100 of FIG. 1, the devices 110, 112 establish a communication path with the service provider 114 via the network nodes 102, 104, 106. The example communication path between the device(s) 110, 112 and the service provider 114 may take one or more of multiple possible routes through the communication network 100 via the network nodes 102-108.

In the example communication network 100, the network nodes 102-106 are provided with corresponding packet collectors 116, 118, 120. The example packet collectors 116-120 collect packets traversing the communication network 100 via the network nodes 102-106 and transmit the collected packets to a packet processor 122 for processing and storage, as described in more detail below. As shown in FIG. 1, not all of the network nodes 102-108 are necessarily provided with a packet collector 116-120. For example, the network node 108 does not have a connected packet collector.

To collect the packets at the packet collectors 116-120, the network nodes 102-106 are configured to mirror all packets (e.g., all received packets, all transmitted packets, etc.) to the respective packet collectors 116-120. For example, the network node 102 provides copies of all received packets and/or transmitted packets to the packet collector 116. Similarly, the network node 104 provides copies of packets of all received packets and/or transmitted packets to the packet collector 118 and the network node 106 provides copies of packets of all received packets and/or transmitted packets to the packet collector 120. The packet collectors 116-120 of FIG. 1 receive streams of packets as the packets are mirrored from the corresponding network nodes 102-106.

In some examples, the packet collectors 116-120 only collect particular types of packets and drop all other types of packets. For example, the packet collectors 116-120 may be configured to collect only packets that are associated with particular types of traffic, such as voice calls, video calls, and/or other real-time applications. In some examples, the network nodes 102-106 only provide copies of the packet types of interest to the packet collectors 116-120, which frees the packet collectors 116-120 from the task of analyzing and dropping packets but may increase the processing burden on the communications network 100.

In the example of FIG. 1, the packet collectors 116-120 collect any packets that contain signaling, control, and content of voice calls traversing the network nodes 102-108 to the service provider 114. Packets that are collected by the packet collectors 116-120 according to one or more criteria are referred to herein as "packets of interest."

The example packet collectors 116-120 are provided with identification criteria that enable the packet collectors 116-120 to identify packets of interest based on the metadata and/or contents of the packets. Additionally or alternatively, the packet collectors 116-120 may identify packets of interest based on a combination of a destination Internet protocol (IP) address in a packet and one or more of a packet type (e.g., Session Initiation Protocol (SIP), Real-time Transfer Protocol (RTP), Real-time Transfer Control Protocol (RTCP), etc.) or a port number (obtained from a User Datagram Protocol (UDP) header). However, the packet collectors 116-120 may extract any other packet data that indicates whether the packet is to be captured and transferred to a packet database 124.

The packet collectors 116-120 analyze the extracted packet data to determine whether a packet is to be captured. For example, the packet collectors 116-120 may analyze the packet data in accordance with one or more packet data rules that specify packet data elements and/or combinations of elements that indicate that a packet should be captured or ignored (e.g., dropped). When the packet collectors 116-120 determines that a packet is to be captured, the example packet collectors 116-120 timestamp the packet capture time and stores the entire selected packet for subsequent delivery to the packet processor 122.

The example packet collectors 116-120 of FIG. 1 transmit packages of collected packets to the example packet processor 122. For example, the packet collector 116 may generate a package including the packets collected during an interval of time (e.g., 300 seconds, 12 hours, 24 hours, or any other time period). In some examples, the packet collector 116 compresses the package and/or encrypts the package prior to transmitting the package to the packet processor 122. In the example of FIG. 1, the packet collectors 116-120 transmit the packages during a period of low demand on the network nodes 102-108 and/or the communication network 100 in general to further reduce the burden on the network nodes 102-108 for delivery of the packages to the packet processor 122. In some other examples, the packet collectors 116-120 send packets at shorter intervals.

The example packet processor 122 of FIG. 1 receives (e.g., via the network nodes 102-106) the packages of packets collected by the packet collectors 116-120. When necessary, the example packet processor 122 decrypts and/or decompresses the packages to obtain the packets contained in the package.

To process the packets in the packages, the example packet processor 122 selects a packet and extracts available metadata from the packet. Example items of metadata that may be extracted by the packet processor 122 from a UDP header of the packet include: an IP source address, an IP destination address, a source port number, and/or a destination port number. Example items of metadata that may be extracted by the packet processor from a SIP message include: a type of SIP message (e.g., a "method" in the SIP protocol), a SIP message code, a TO user name, a TO user resource identifier (URI), a TO IP address, a FROM user name, a FROM URI, a FROM IP address, a unique call identifier, a geolocation identifier, and one or more branch identifiers (e.g., from respective VIA fields in the SIP protocol). However, any other standard and/or network-proprietary data may be extracted from the packets.

The example packet processor 122 of FIG. 1 further assigns an identifier to the processed packet to enable subsequent identification of the packet in the packet database 124. The packet processor 122 stores the entirety of the packet in the example packet database 124 and indexes the packet in the packet database 124 using the extracted data.

The example packet database 124 stores an Index Table 130 and a Calls Table 132. The example Index Table 130 stores records that point to respective packet capture files stored in the Calls Table 132. In the example of FIG. 1, the Calls Table 132 stores full copies of the packet capture files (e.g., including signaling and voice packets) with an index key. The records in the Index Table 130 are searched to identify calls of interest to, for example, a customer service provider for the communication network. The records each include a key pointing to a packet capture file in the Calls Table 132 containing the packet from which the record was generated. When a record is identified during execution of a query, the key contained in the record is used to locate and access the packet capture file stored in the Calls Table 132.

In some examples, the packet database 124 purges (e.g., drops, deletes, archives) records stored in the Index Table 130 and/or packet capture files stored in the Calls Table 132 that are older than a threshold age. By purging old records and packet capture files, the example packet database 124 is kept to a manageable size and/or is capable of providing an acceptable response time to queries of the packet database 124.

The example communication network 100 of FIG. 1 further includes a query processor 140. The example query processor 140 receives a query (e.g., from a client device 142), searches the packet database 124 based on the query, and returns one or more voice calls matching the query to the requesting client device 142. As described in more detail below, the example query processor 140 may receive multiple packets from the packet database 124 as a response to a query representing one or more voice calls. The example query processor 140 processes the raw results (e.g., the packets from the packet database 124) to determine that multiple packets belong to a same voice call. The query processor 140 then combines the packets for the same voice call into a single voice call file containing the entirety of the end-to-end voice call, including the "hops" of the packets between the network nodes 102-106.

When a query matches the index values of a packet in the packet database 124, the example query processor 140 retrieves the full packet referenced by the index values and returns the packet as a query result. Assembling and returning the full signaling and voice data for a call enables the requester to analyze the entirety of the call using, for example, the Wireshark analysis tool.

The example packet processor 122, the example packet database 124, and/or the example query processor 140 may be implemented by a single entity, such as the provider of the communication network 100 and/or a network monitoring and/or troubleshooting service that is a separate entity than the provider of the communication network 100.

As shown in FIG. 1, not all of the network nodes 102-108 is required to have a packet collector 116-120 to successfully perform end-to-end packet capture. Instead, packet collectors 116-120 may be placed at strategically-selected network nodes 102-106 capable of capturing packet traversal through an entire portion of interest of the communications network 100.

Figure 2:
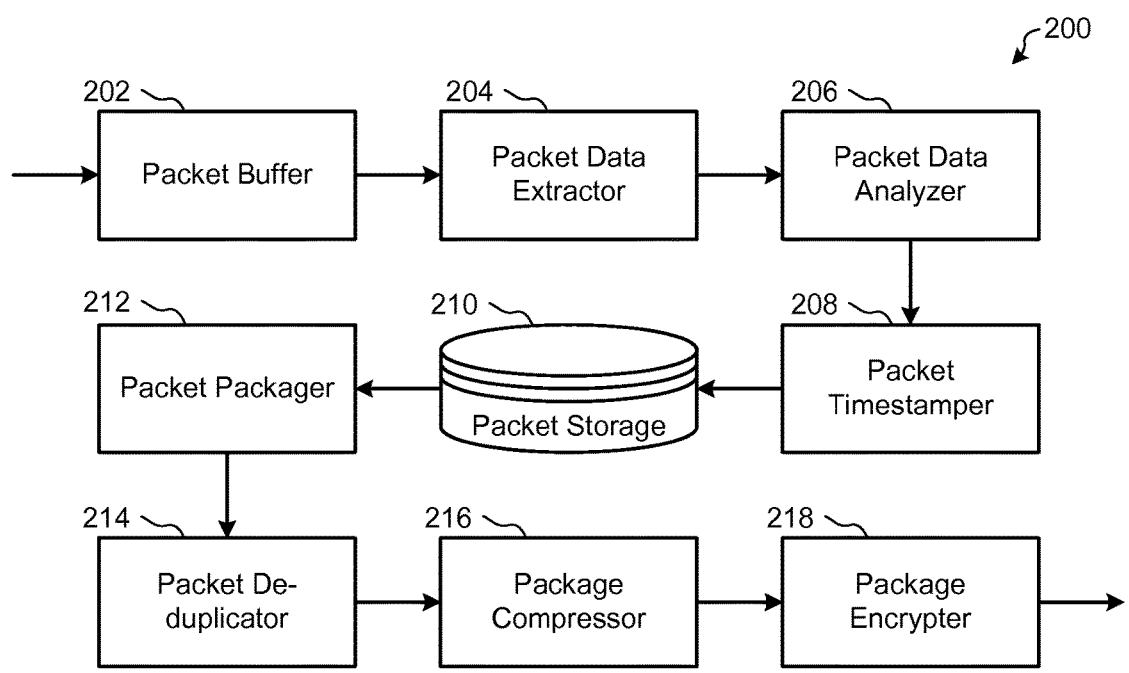
FIG. 2 is a block diagram of an example packet collector that may implement any of the example packet collectors of FIG. 1.

FIG. 2 is a block diagram of an example packet collector 200 that may implement any of the example packet collectors 116-120 of FIG. 1. The example packet collector 200 of FIG. 2 includes a packet buffer 202, a packet data extractor 204, a packet data analyzer 206, a packet timestamper 208, packet storage 210, a packet packager 212, a packet deduplicator 214, a package compressor 216, and a package encrypter 218.

The example packet buffer 202 receives and temporarily stores packets obtained from the corresponding network node 102-106. The packet buffer 202 queues the obtained packets for subsequent processing in, for example, a first-in-first-out (FIFO) method.

The example packet data extractor 204 selects a packet from the packet buffer 202 and extracts packet data from the selected packet. For example, the packet data extractor 204 extracts information from the header of Transfer Control Protocol (TCP), UDP, SIP and/or RTP layers of packets. Examples of such information include TCP ports, UDP ports, source and/or destination IP addresses, and/or protocols (e.g. SIP, RTP).

The example packet data analyzer 206 analyzes the extracted data to determine whether one or more of the extracted packet data indicate that the packet is to be captured. For example, if the extracted data includes UDP port 5060, TCP port 5060, and/or TCP port 5061, the packet is a SIP packet and the packet data analyzer 206 determines that the packet is to be stored in the packet storage 210. In some examples, the packet data analyzer 206 may determine that the packet is to be stored in the packet storage when the extracted data includes a UDP port in the range 6000-60000 (or another range).

The example packet timestamper 208 timestamps the packets that the packet data analyzer 206 determines are to be captured. In the example of FIG. 2, the packet timestamper 208 timestamps the packet with the capture time. When the packet is timestamped, the example packet timestamper 208 stores the full packet in the packet storage 210. The example packet storage 210 is a temporary storage for collected packets until transfer (e.g., transmission) of the collected packets to the packet processor 122 of FIG. 1.

The example packet packager 212 creates a packet capture file from the packets stored in the packet storage 210. In some examples, the packet packager 212 creates the packet capture files at designated intervals (e.g., every 300 seconds, or any other interval). The example packet packager 212 includes packets collected since the most recent packet capture file generation in the created packet capture file.

To conserve bandwidth in the communications network 100, the example packet de-duplicator 214 de-duplicates packets and/or removes redundant packets from the packet capture file. For example, the packet de-duplicator 214 may remove loopback packets (e.g., SIP and/or RTP loopback packets). In RTP, a loopback packet is a copy of an original packet that is transmitted back to the source of the original packet. Therefore, the loopback packet is redundant to the original packet.

The example package compressor 216 compresses the packet capture file to reduce the size (e.g., in bytes) of the packet capture file. Compressing the packet capture file reduces the load on the communication network 100, which is useful when large numbers of packet collectors 116-120 (e.g., hundreds, thousands, tens of thousands) are transmitting packet capture files to the packet processor 122. The example package encrypter 218 encrypts the (compressed) packet capture file to reduce the chances that the voice content in the collected packets may be discerned if the packet capture files are intercepted by an unauthorized party.

Figure 3:
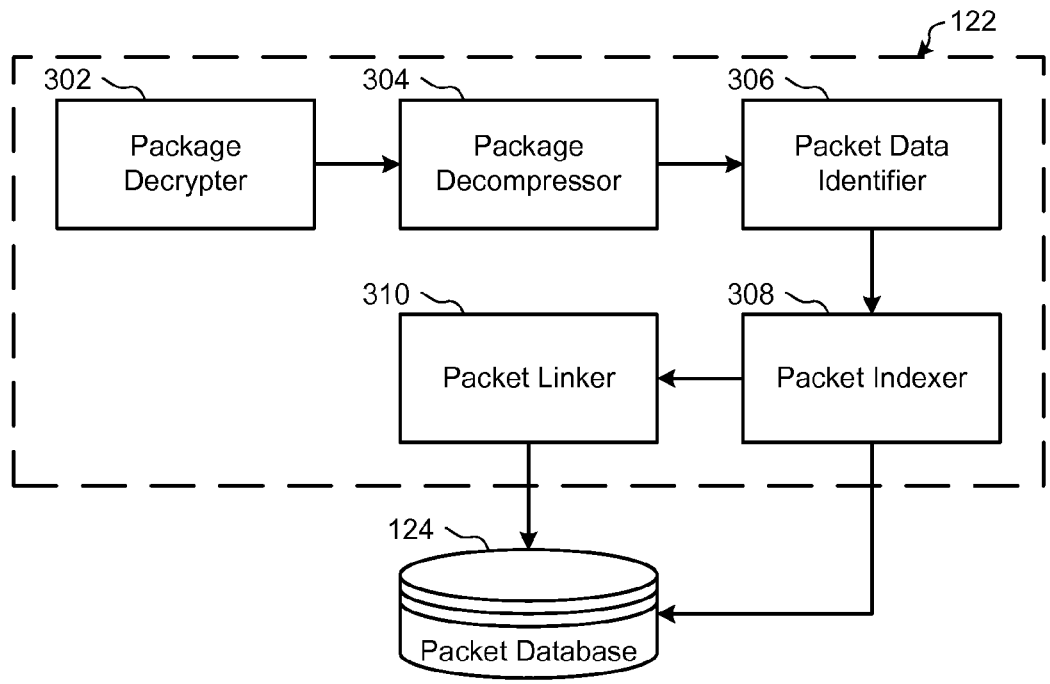
FIG. 3 is a more detailed block diagram of the example packet processor of FIG. 1.

FIG. 3 is a more detailed block diagram of the example packet processor 122 of FIG. 1. The example packet processor 122 of FIG. 3 receives captured packets from the packet collectors 116-120 of FIG. 1, indexes the captured packets, and stores the packets and the index data in the packet database 124. The example packet processor 122 of FIG. 1 includes a package decrypter 302, a package decompressor 304, a packet data identifier 306, a packet indexer 308, and a packet linker 310.

The example package decrypter 302 of FIG. 3 receives packet capture files including multiple packets from the packet collectors 116-120 of FIG. 1 and decrypts the packet capture files. The example package decompressor 304 decompresses the decrypted packet capture files to obtain discrete packets captured by the packet collectors 116-120. In some examples in which the packet collectors 116-120 do not encrypt and/or do not compress the packets, the example packet processor 122 may omit the package decrypter 302 and/or the package decompressor 304.

The example packet data identifier 306 of FIG. 3 identifies or extracts data (e.g., metadata) from the packets. In some examples, the packet data identifier 306 extracts SIP data representing a unique leg, between ones of the network nodes 102-106, of a unique end-to-end call (e.g., a VoIP call). In some examples, the packet data identifier 306 includes and/or makes calls to code libraries that correspond to protocols of interest. For example, the packet data identifier 306 may call methods from a library for processing SIP and/or RTP packets to parse the packets in a manner similar or identical to the extraction of SIP and/or RTP data by the devices participating in a call. In the example of FIG. 3, the packet data identifier 306 receives the resulting metadata as an output from the method call.

The example packet indexer 308 generates a packet record or index entry in an index table (e.g., the Index Table 130) of the packet database 124 based on the identified packet data. For example, the packet indexer 308 may generate a SQL statement to add a row including the metadata identified by the packet data identifier 306.

The example packet linker 310 stores packet files in the packet database 124 (e.g., in the Calls Table 132) and links the corresponding packet records to the packet file(s). Because multiple packets are received in a packet file from a packet collector 116-120, in some examples multiple indexes point to a same packet file containing the packet data, including signaling and content of calls. To link a packet index to its corresponding packet file, the example packet linker 310 updates an index record (e.g., index table row) in the Index Table 130 of the packet database 124 with the file name of the corresponding packet file.

Figure 4:
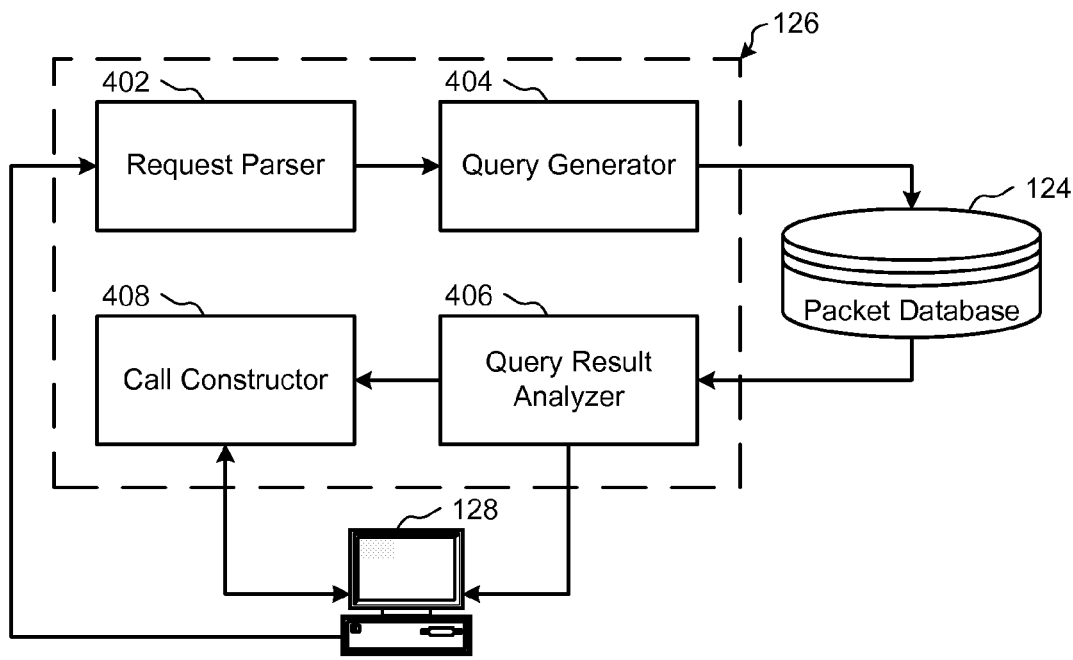
FIG. 4 is a more detailed block diagram of the example query processor of FIG. 1.

FIG. 4 is a more detailed block diagram of the example query processor 140 of FIG. 1. The example query processor 140 of FIG. 4 receives queries from client devices (e.g., the client device 142 of FIG. 1), executes the query at the packet database 124, and processes the query results to provide a set of packets corresponding to a same unique call. The example query processor 140 of FIG. 4 includes a request parser 402, a query generator 404, a query result analyzer 406, and a call constructor 408.

The example request parser 402 receives search requests for call information in the packet database 124. In the example of FIG. 4, search requests may specify one or more of a time range, a search string (e.g., keywords, Boolean searches, etc.), a particular portion of the communication network 100 from which packets are (e.g., a particular deployment of the packet collectors 116-120).

Using the data in the search query, the example query generator 404 generates a query (e.g., a SQL query) to be executed by the packet database 124. For example, the query generator 404 may transform one or more fields of the search request into parameters or premises on one or more keys in the Index Table 130 of the packet database 124. The example query generator 404 executes the query (or submits the query for execution) at the packet database 124.

The example query result analyzer 406 receives the results of the query from the packet database 124. The query results include, for example, a set of index records (e.g., rows) satisfying the query generated by the query generator 404. The example query result analyzer 406 formats the query results for presentation to the requester (e.g., to the user at the client device 142 that provided the search request to the request parser 402). An example presentation of search results may include a table such as the table described below with reference to FIG. 6. In the example of a table, each record (e.g., row) corresponds to an identified packet (e.g., an identified SIP packet), which is linked in the packet database 124 to a corresponding packet capture file containing the SIP packets and the RTP packets. Example search results including the TO SIP address, the FROM SIP address, a timestamp, and/or a size of the file(s) associated with the search result.

The example query generator 404, the example query result analyzer 406, and the example call constructor 408 analyze the search results and/or perform subsequent queries (e.g., subqueries on the search results, subsequent queries of the packet database 124 based on the search results, etc.) to identify corresponding ones of the packets that are part of the same call. An example field that may be used to match packets is a call identifier field. A SIP call identifier uniquely identifies a call between parties. An example field is a branch identifier (e.g., branchID), which is extracted from the SIP header of a packet (e.g., by the packet data identifier 306 of FIG. 3) and that identifies one or more prior "hops" taken by a SIP message prior to being captured at a network node 102. The branch identifier may be matched to the branch identifier and/or IP addresses of other packets so that, in combination with the call identifier, source identifier(s), and/or destination identifier(s), the packets can be matched.

For example, in response to determining that a first record in the packet database 124 matches a query, the query generator 404, the example query result analyzer 406, and the example call constructor 408, identify a second record in the packet database 124 as belonging to the same unique voice call as the first record in the packet database 124 based on determining that first metadata of the first record matches second metadata of the second record. In some such examples, the query result analyzer 406 identifies a second record in the packet database 124 as belonging to the same unique voice call as a first record by determining that a difference between the respective timestamps of the first and second records satisfies a threshold and matching at least one branch identifier of the first record to at least one branch identifier of the second packet and/or determining that the first and second records have matching unique call identifiers.

The example call constructor 408 receives selection of one or more search results (e.g., from the client device 142). The call constructor 408 identifies, for each of the selected search results, additional packet(s) corresponding to the same call as the selected search result. For example, the call constructor 408 may analyze the index records (e.g., rows) of the selected search results to identify fields that can be used to match different packets and/or legs of a call.

FIG. 5 is an example packet index 500 that may be stored in the example packet database of FIG. 1. The example packet index 500 of FIG. 5 includes a set of fields 502-542 and corresponding data extracted from a captured data packet.

An example id field 502 is a unique value to identify the packet in the Index Table 130. Each record in the Index Table 130 has a unique value in the id field 502. In the example of FIG. 3, the packet indexer 308 generates a value for the id field 502 and includes the value in the index record. An example h_ip_src field 504 is an IP address of a source of the packet. Conversely, an example h_ip_dest field 506 is an IP address of a destination of the packet. The example h_ip_src field 504 and h_ip_dest field 506 may be obtained from, for example, a UDP header of a captured packet.

An example h_isresponse field 508 is a Boolean value indicating whether a code (e.g., a SIP code), or type of message, in the packet is a response code or a non-response code (e.g., a request code). Examples of response codes for SIP include 100 Trying, 200 Ok, and 180 Ringing. If the message is a response (e.g., not a request), the h_isresponse field 508 has a value indicating that the message is a response and a h_responsecode field 510 and a h_responsetxt field 512 provide further detail about the response. The h_responsecode field 510 includes the response code (e.g., 200, 100, 180, etc. for SIP) and the h_responsecode field 512 may include further information such as a reason phrase.

An example h_fromIP field 514 may be obtained from the SIP header of a packet (e.g., from an SDP header in a SIP packet) and indicates the IP address of the sending party (i.e., the sending party of the packet, not necessarily the calling party). Similarly, an example h_toIP field 516 may be obtained from the SIP header of a packet (e.g., from the SDP header in a SIP packet) and indicates the IP address of the receiving party (i.e., the receiving party of the packet, not necessarily the called party).

An example h_method field 518 indicates the type of request and/or the type of request to which the packet is a response. In the case of a SIP packet, the example packet data identifier 306 may obtain the method to populate the h_method field 518 from a SIP packet header. For example, the h_method field 518 may include a SIP method such as INVITE or OPTION. However, these are examples and any method may be included in the h_method field.

An example h_callID field 520 may be obtained from the SIP header of a packet (e.g., the Call-ID), and uniquely identifies a call. The SIP Call-ID appears in every SIP request and every SIP response. The Call-ID is required by the applicable standard to be globally unique and is generally a GUID (Globally Unique Identifier) associated with the IP addresses of the sender. An example of a Call-ID is 77_296a31b7bd48ea6d916db4_I@ 43.56.1.10.

An example h_TO field 522 may be obtained from the SIP header of a packet (e.g., a to field of the SIP header). The example TO field 522 is a URI of the receiving party of the packet. An example h_TO number field 524 includes, for example, a phone number corresponding to the URI specified in the h_TO field 524.

Similarly, an example h_FROM field 526 may be obtained from the SIP header of a packet (e.g., a to field of the SIP header). The h_FROM field 526 is a URI of the sending party of the packet. An example h_FROM_number field 528 includes, for example, a phone number corresponding to the URI specified in the h_FROM field 526.

An example h_Pident_num field 530 is an asserted identity that may be inserted into a packet by a server and/or by the calling device to indicate privacy of some aspect of the call. In SIP, an asserted identity enables the communications network 100 and/or a call server to identify the calling party (e.g., for billing purposes) without necessarily revealing the calling party's identity to the called party. The example h_Pident_num field 530 may be extracted from the P-Asserted-Identity header in a SIP packet, when present in the packet.

An example h_geolocation_num field 532 is an identifier of a geographic area of the calling party and/or the called party. The geolocation may be any type of identification, such as a cell tower number, an access point location, or Global Positioning System (GPS) coordinates (or their encoded equivalent). The example h_geolocation_num field 532 may be extracted from a SIP header.

An example h_Via1_branchID field 534, an example h_Via2_branchID field 536, and an example h_Via3_branchID field 538 are fields that indicate the routing of the corresponding packet through the network. When a user agent client (e.g., the client devices 110, 112 of FIG. 1) creates a SIP request, the user agent client must insert a Via header into that request. The Via header identifies the protocol name (e.g., SIP), protocol version (e.g., 2.0), transport type (e.g., UDP or TCP), IP address of the user agent client, and the protocol port (e.g., 5060) used for the request.

Along with the protocol and IP information, every Via header contains a "branch" parameter. In SIP communications that are in accordance with RFC 3261, the branch parameter always begins with the same string of seven characters: "z9hG4bK." For example, if a SIP soft-phone were to send an INVITE request, the request would contain a Via similar to: "Via: SIP/2.0/UDP 17.202.87.23:5060; branch=z9hG4bK10_16a83292baa1de54e0b7843_I." The example table 500 includes 3 branchID fields 524-528 to enable subsequent merging of packets into a unique call, as described in more detail below.

An example h_filename field 540 describes a file name of a packet capture file containing the packet from which the data in the table 500 is extracted. The example h_filename field 540 may include, for example, a key corresponding to the packet capture file location in the Calls Table 132 of the packet database 124.

An example timestamp field 542 is a timestamp of the packet from which the data is extracted. The timestamp field 542 may include, for example, the timestamp from the SIP header.

In some examples, the packet index 500 includes non-standard information available to the provider of the communications network 100 and/or to the service provider 114. For example the packet index 500 may further include proprietary call identifiers, trunk information, channel information, diagnostic information, and/or other non-standard information which may be present in the packets. Such information may be added to SIP and/or RTP packets by, for example, the network nodes 102-108 and/or call servers during traversal of the packets through the communication network 100.

FIG. 6 is an example table 600 illustrating results of a query of the packet database 124 of FIG. 1. The example table 600 of FIG. 6 includes entries 602-606 that correspond to index records identified by executing the query. Each of the example entries 602-606 includes fields 608-616 that enable a requester to identify and/or select calls of interest from the query results.

An example Select field 608 enables the requester to select either signaling or a combination of signaling and voice for a particular call corresponding to the 602-606. The example Select field 608 of FIG. 6 includes selection options for SIP-only 618 and SIP+RTP 620. If the SIP-only option 618 is selected, the example call constructor 408 of FIG. 4 returns only the SIP packets to the requester. Conversely, if the SIP+RTP option 620 is selected, the example call constructor 408 returns the SIP packets and the RTP packets containing the voice content of the call corresponding to the selected record 602-606.

An example To field 610 of FIG. 6 includes the content of one or more of the h_ToIP field 516, the h_TO field 522, and/or the h_TO number field 524 of the table 500 of FIG. 5. An example From field 612 of FIG. 6 includes the content of one or more of the h_FromIP field 514, the h_FROM field 526, and/or the h_FROM_number field 528 of the table 500. The TO field 610 and/or the FROM field 612 may assist a requester in identifying the calls of interest.

An example Time field 614 includes the content of the timestamp field 542 of FIG. 5 for the corresponding record. The example Time field 614 of FIG. 6 is expressed in Greenwich Mean Time (GMT), but any time zone may be used.

An example Size field 616 of FIG. 6 describes the size of the corresponding packet capture file to referenced by the h_filename field 540 of FIG. 4. The example Size field 616 of FIG. 6 is expressed in Bytes (e.g., K=kilobytes, M=megabytes, etc.). The example Size field 616 of FIG. 6 reflects the size of all of the packet capture files referenced in the corresponding records.

While example manners of implementing the example communication network 100 are illustrated in FIGS. 1, 2, 3, and 4 one or more of the elements, processes and/or devices illustrated in FIGS. 1, 2, 3, and/or 4 may be combined, divided, re-arranged, omitted, eliminated and/or implemented in any other way. Further, the example packet database 124, the example packet buffer 202, the example packet data extractor 204, the example packet data analyzer 206, the example packet timestamper 208, the example packet storage 210, the example packet packager 212, the example packet de-duplicator 214, the example package compressor 216, the example package encrypter 218, the example package decrypter 302, the example package decompressor 304, the example packet data identifier 306, the example packet indexer 308, the example packet linker 310, the example request parser 402, the example query generator 404, the example query result analyzer 406, the example call constructor 408 and/or, more generally, the example packet collectors 116-120, the example packet processor 122, and/or the example query processor 140 of FIGS. 1, 2, 3, and/or 4 may be implemented by hardware, software, firmware and/or any combination of hardware, software and/or firmware. Thus, for example, any of the example packet database 124, the example packet buffer 202, the example packet data extractor 204, the example packet data analyzer 206, the example packet timestamper 208, the example packet storage 210, the example packet packager 212, the example packet de-duplicator 214, the example package compressor 216, the example package encrypter 218, the example package decrypter 302, the example package decompressor 304, the example packet data identifier 306, the example packet indexer 308, the example packet linker 310, the example request parser 402, the example query generator 404, the example query result analyzer 406, the example call constructor 408 and/or, more generally, the example packet collectors 116-120, the example packet processor 122, and/or the example query processor 140 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example packet database 124, the example packet buffer 202, the example packet data extractor 204, the example packet data analyzer 206, the example packet timestamper 208, the example packet storage 210, the example packet packager 212, the example packet de-duplicator 214, the example package compressor 216, the example package encrypter 218, the example package decrypter 302, the example package decompressor 304, the example packet data identifier 306, the example packet indexer 308, the example packet linker 310, the example request parser 402, the example query generator 404, the example query result analyzer 406, and/or the example call constructor 408 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example packet collectors 116-120, the example packet processor 122, and/or the example query processor 140 of FIG. 1 may include one or more elements, processes and/or devices in addition to, or instead of, those illustrated in FIGS. 1, 2, 3, and/or 4, and/or may include more than one of any or all of the illustrated elements, processes and devices.

Flowcharts representative of example machine readable instructions for implementing the example packet collectors 116-120, the example packet processor 122, and/or the example query processor 140 of FIGS. 1, 2, 3, and/or 4 are shown in FIGS. 7, 8, 9, and 10. In this example, the machine readable instructions comprise programs for execution by a processor such as the processors 1112, 1212 shown in the example processor platforms 1100, 1200 discussed below in connection with FIGS. 11 and 12. The programs may be embodied in software stored on a tangible computer readable storage medium such as a CD-ROM, a floppy disk, a hard drive, a digital versatile disk (DVD), a Blu-ray disk, or a memory associated with the processor 1112, 1212, but the entire programs and/or parts thereof could alternatively be executed by a device other than the processor 1112, 1212 and/or embodied in firmware or dedicated hardware. Further, although the example programs are described with reference to the flowcharts illustrated in FIGS. 7, 8, 9, and 10, many other methods of implementing the example packet database 124, the example packet buffer 202, the example packet data extractor 204, the example packet data analyzer 206, the example packet timestamper 208, the example packet storage 210, the example packet packager 212, the example packet de-duplicator 214, the example package compressor 216, the example package encrypter 218, the example package decrypter 302, the example package decompressor 304, the example packet data identifier 306, the example packet indexer 308, the example packet linker 310, the example request parser 402, the example query generator 404, the example query result analyzer 406, and/or the example call constructor 408 may alternatively be used. For example, the order of execution of the blocks may be changed, and/or some of the blocks described may be changed, eliminated, or combined.

As mentioned above, the example processes of FIGS. 7, 8, 9, and/or 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 7, 8, 9, and/or 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 7:
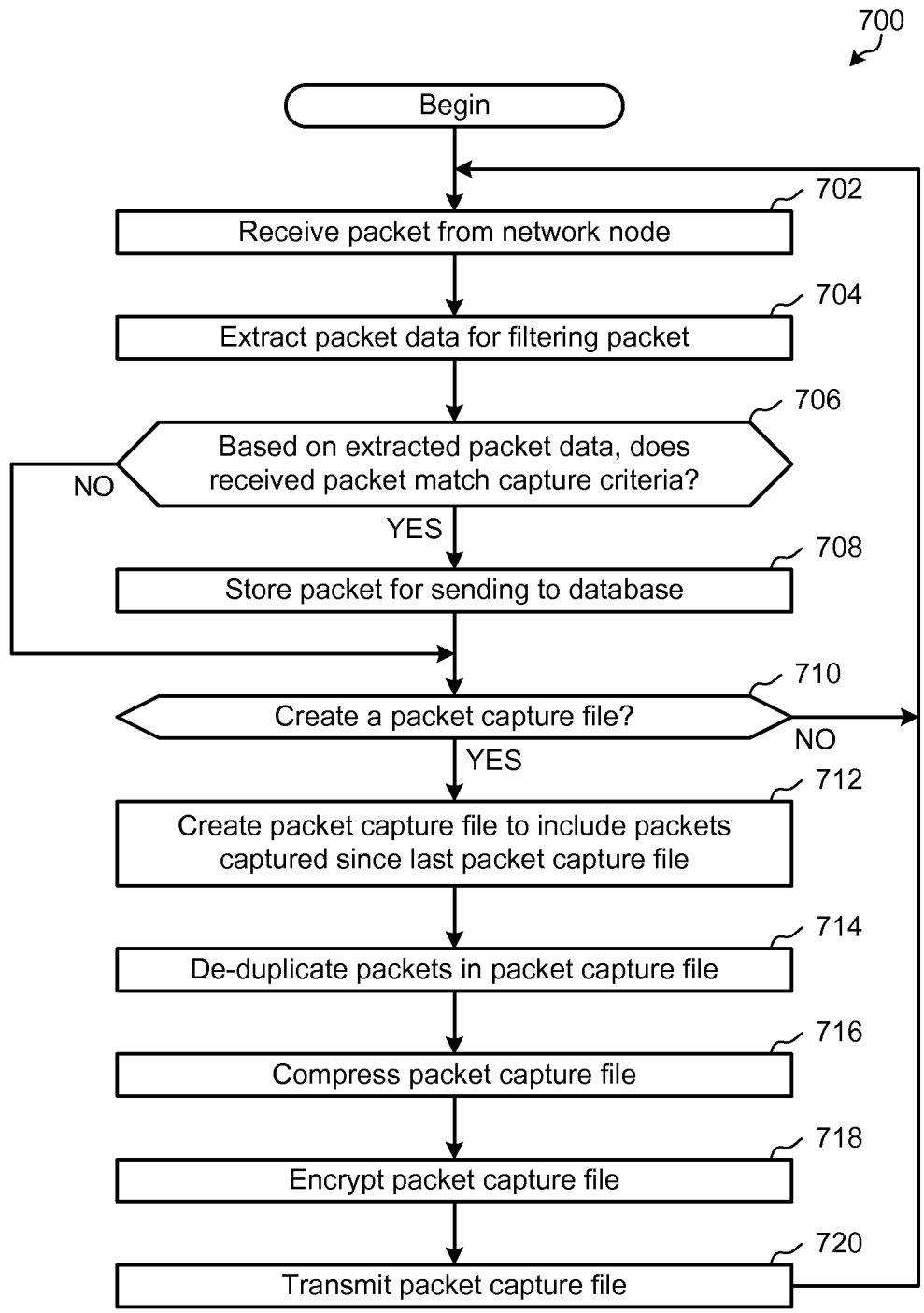
FIG. 7 is a flowchart representative of example machine readable instructions which may be executed by the example packet collector of FIGS. 1 and/or 2 to collect packets in a network.

FIG. 7 is a flowchart representative of example machine readable instructions 700 which may be executed by the example packet collectors 116-120, 200 of FIGS. 1 and/or 2 to collect packets in a network. The example instructions 700 are described below with reference to the packet collector 200 of FIG. 2. However, the instructions 700 are also applicable to the packet collectors 116-120 of FIG. 1.

The example packet buffer 202 receives a packet from a network node (e.g., a network node 102-108 of FIG. 1 corresponding to the packet collector 200) (block 702). In some examples, the packet data extractor 204 receives the packet via the packet buffer 202.

The example packet data extractor 204 extracts packet data from the packet for filtering the packet (block 704). For example, the packet data extractor 204 may extract a protocol used in the packet, source and/or destination addresses and/or ports, and/or any other information about the packet.

The packet data analyzer 206 determines whether the received packet matches capture criteria based on the extracted packet data (block 706). If, based on the extracted packet data, the received packet matches one or more capture criteria (block 706), the packet data analyzer 206 stores the packet in the packet storage 210 for subsequent transfer to a central packet collection or database (e.g., the packet database 124 of FIG. 1) (block 708). In some examples, the packet timestamper 208 timestamps the packet prior to storage in the packet storage 210 and/or timestamps the stored packet in the packet storage 210.

After storing the packet (block 708) or if, based on the extracted packet data, the received packet matches one or more capture criteria (block 706), the example packet packager 212 determines whether to create a packet capture file (block 710). For example, the packet packager 212 may be configured create a packet capture file in response to the expiration of a time interval (e.g., 300 seconds or any other interval) that resets after the creation of a packet capture file, and/or at a particular time of day (e.g., 2 A.M.). If the packet packager 212 is to create a packet capture file (block 710), the example packet packager 212 creates the packet capture file to include packets captured since the last packet capture file was created (block 712). In this way, the example packet packager 212 does not duplicate packets between packet capture files.

The example packet de-duplicator 214 de-duplicates packets in the packet capture file (block 714). For example, the packet de-duplicator 214 may de-duplicate packets by identifying and removing loopback packets from the packet capture file.

The example package compressor 216 compresses the packet capture file (block 716). The package compressor 216 may use any type of data compression. Data compression of the packet capture file reduces the load on the communication network 100 from multiple packet collectors 116-120 transmitting packet capture files that include relatively high amounts of data, such as voice call contents. The example package encrypter 218 encrypts the packet capture file (block 718). The package encrypter 218 may use any type of encryption to reduce the probability that a party that intercepts the packet capture file is capable of listening to the voice call contents (e.g., intentional or unintentional eavesdropping). The example package encrypter 218 transmits the packet capture file to a packet processor (e.g., the packet processor 122 of FIGS. 1 and/or 3) (block 720).

Figure 8:
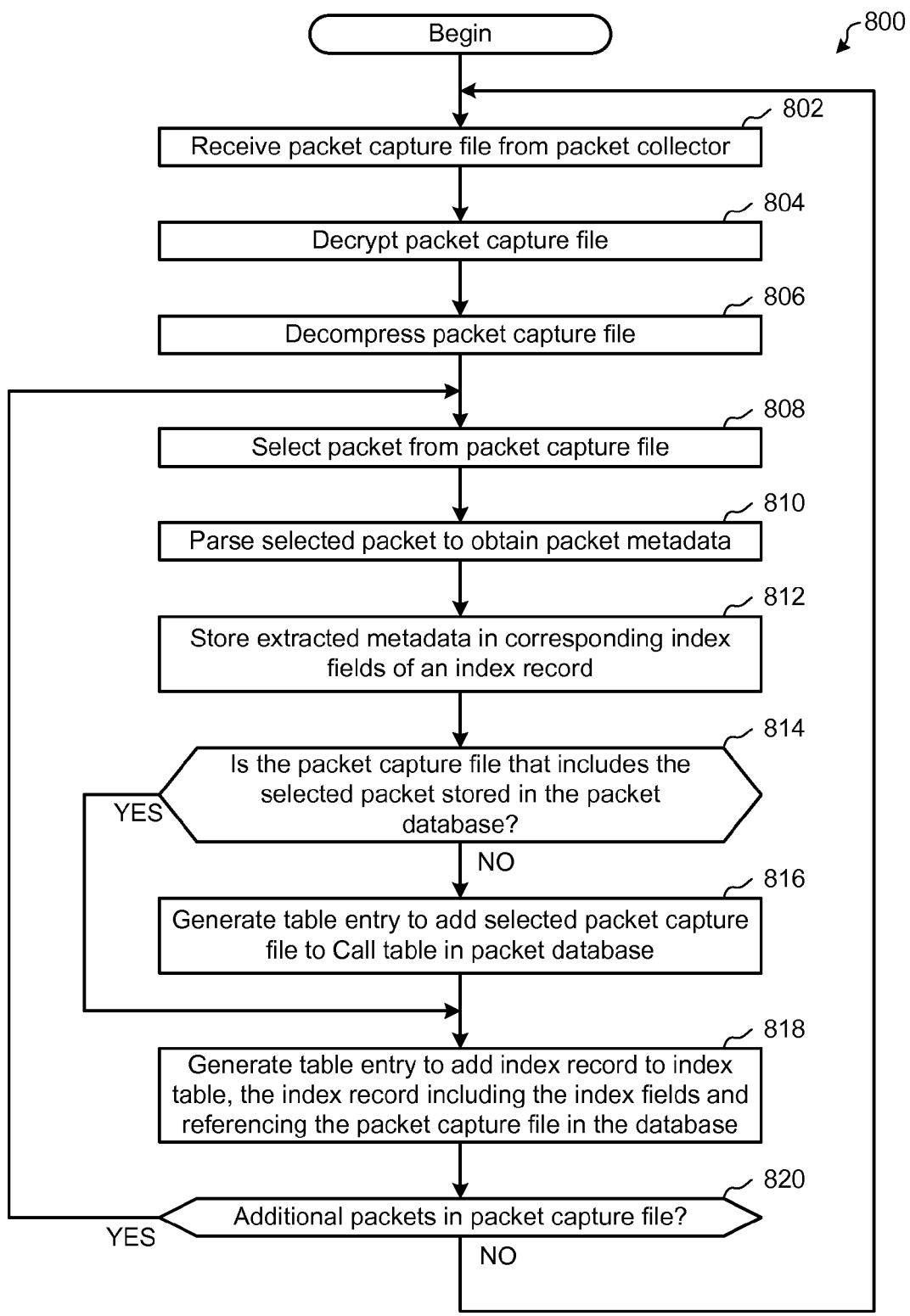
FIG. 8 is a flowchart representative of example machine readable instructions which may be executed by the example packet processor of FIGS. 1 and/or 3 to process packets collected by the example packet collectors of FIG. 1.

FIG. 8 is a flowchart representative of example machine readable instructions 800 which may be executed by the example packet processor 122 of FIGS. 1 and/or 3 to process packets collected by the example packet collectors 116-120 of FIG. 1. The example instructions 800 are described below with reference to FIG. 3.

The example packet processor 122 (e.g., via the package decrypter 302, the package decompressor 304, or the packet data identifier 306) receives a packet capture file (e.g., from one of the packet collectors 116-120 of FIG. 1) (block 802). In the example of FIG. 8, the package decrypter 302 decrypts the packet capture file (block 804) and the package decompressor 304 decompresses the packet capture file (block 806). In examples in which the received packet capture file is not encrypted and/or is not compressed, block 804 and/or block 806 may be omitted.

The example packet data identifier 306 selects a packet from the packet capture file (block 808). The packet data identifier 306 parses the selected packet to obtain packet metadata (block 810). For example, the packet data identifier 306 may parse packets using one or more parsers (e.g., SIP parsers, UDP parsers, RTP parsers, IP parsers, Ethernet parsers, etc.). The example packet data identifier 306 of FIG. 3 extracts the metadata described above with reference to FIG. 5.

The example packet indexer 308 stores the extracted metadata in corresponding index fields of an index record (block 812). Example index fields are described above with reference to FIG. 5. An index record includes a combination of the index fields, which may be subsequently searched in response to a query.

The example packet linker 310 determines whether the packet capture file that included the selected packet is stored in the packet database 124 (block 814). For example, the packet linker 310 may have stored the selected packet in the packet database 124 while processing a previous packet obtained in the same packet capture file. If the packet capture file is not stored in the packet database (block 814), the example packet linker 310 generates a table entry to add the selected packet capture file to a "Call" table in the packet database 124 (block 816). The example "Call" table stores the packet capture files with a reference number or identifier for linking from the Index Table 130.

If the packet capture file that included the selected packet is stored in the packet database 124 (block 814), or after generating the table entry (block 816), the example packet indexer 308 generates a table entry to add an index record to an Index Table 130, where the index record includes the index fields and references the corresponding packet capture file in the packet database 124 (block 818). For example, the packet indexer 308 may create a record in the Index Table 130 of the packet database 124, populate the record with the packet metadata of the selected packet, and include the reference or identifier to the packet capture file in the Index Table 130.

The example packet data identifier 306 determines whether there are additional packets in the packet capture file (block 820). If there are additional packets in the packet capture file (block 820), control returns to block 808 to select another packet. When there are no more packets in the packet capture file (block 820), control returns to block 802 to receive another packet capture file. In some other examples, when there are no more packets in the packet capture file, the example instructions 800 end. The instructions 800 may then be called again for a subsequent packet capture file received at the packet processor 122.

Figure 9:
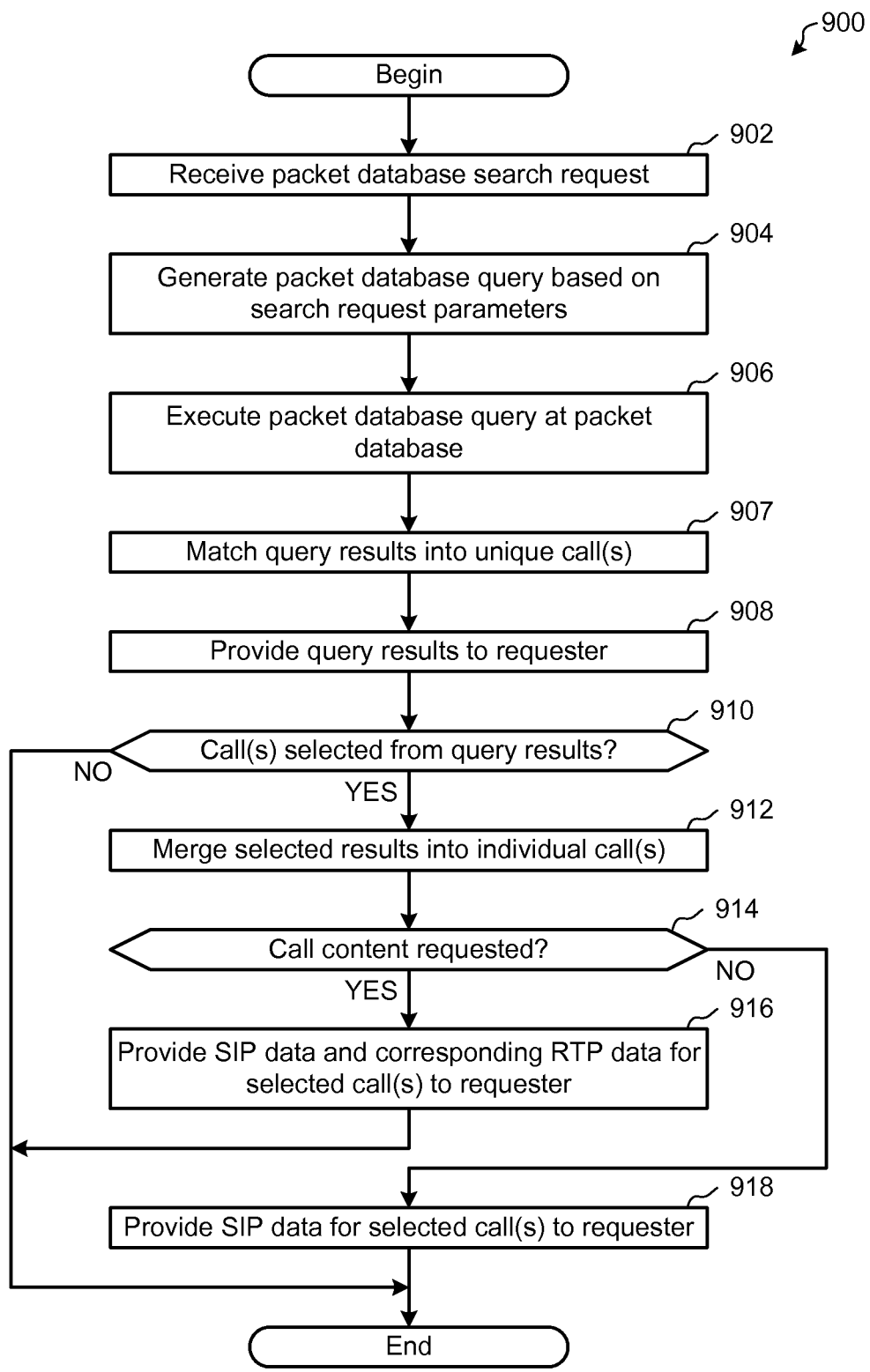
FIG. 9 is a flowchart representative of example machine readable instructions which may be executed by the example query processor of FIGS. 1 and/or 4 to query the packet database of FIG. 1 for captured packets corresponding to a call of interest.

FIG. 9 is a flowchart representative of example machine readable instructions 900 which may be executed by the example packet query processor of FIGS. 1 and/or 4 to query the packet database of FIG. 1 for captured packets corresponding to a call.

The example request parser 402 receives a packet database search request (e.g., from the client device 142 of FIG. 1) (block 902). The packet database search request may be a set of parameters specified by a user of the client device 142 to access one or more desired calls (e.g., to perform network troubleshooting services voice calls or other communications). Example search criteria for a call search include a start and/or an end of a date and/or time range, keyword(s), and/or an identification of one or more portions of the communication network 100 to which the query should be applied (e.g., a geographically-bounded part of the network, a particular deployment to a service provider, etc.).

The example query generator 404 generates a query for execution at the packet database 124 based on the search request parameters (block 904). For example, the query generator 404 may convert the parameters specified in the search request to query premises (e.g., SQL statements) on the Index Table 130 of the packet database 124. In some examples, the query generator 404 creates query premises using the search string on multiple ones of the fields 502-538 of FIG. 5. In some examples, the query may restrict the packets to one or more portions of the communications network 100 (e.g., to particular ranges of IP addresses, to particular calling and/or called parties, etc.). The example query generator 404 executes the packet database query (e.g., via the packet database 124 and/or a query handler that manages the packet database 124) (block 906). For example, the query generator 404 may submit the query for processing by the packet database 124.

The example query result analyzer 406 matches the query results (e.g., unique calls) into one or more unique call(s) (block 907). As used herein, the term "unique call" refers to a single voice and/or video session between two or more devices. In the SIP protocol, a unique call may be initiated by an INVITE request from a calling device and end with a "BYE" message sent from one or more of the devices. The query result analyzer 406 may match query results into calls by identifying packets that are part of a same unique voice call between devices across the communications network 100 and merges the packets into a call file. In some examples, the call constructor 408 identifies additional packets not included in the selected results in the unique call based on the matching. Instructions that may be performed to implement block 907 are described below with reference to FIG. 10.

The example query result analyzer 406 provides the query results to the requester (block 908). For example, the query result analyzer 406 may provide the query results in a table similar to the table 600 of FIG. 6 described above. In some examples, the query result analyzer 406 may format the query results (e.g., the records identified by executing the query) for display at the client device 142 (e.g., as an HTML document) and send the formatted query results to the client device 142.

The example query result analyzer 406 determines whether one or more calls are selected from the query results (e.g., by a user of the client device 142) (block 910). For example, the query result analyzer 406 may await a response from the client device 142 including the selection of one or more results from the results provided by the query result analyzer 406. If one or more calls are selected (block 910), the example call constructor 408 merges the selected result(s) into individual calls (block 912). For example, the call constructor 408 may merge records that are located in different packet capture files in the packet database 124 into individual call files. The call constructor 408 may, for example, select records identified as belonging to a call, retrieve the packet capture files identified in the selected records, order the packets in the packet capture files by timestamp, and reassemble the packets into a call file in order by timestamp.

The example call constructor 408 determines whether the call content was requested (block 914). For example, the requester may be given the ability to select between downloading just the signaling files for a call (e.g., the SIP packets) and downloading the signaling files and the call content (e.g., the SIP packets and the voice data in the RTP packets). In the example of downloading calls to facilitate network troubleshooting, full call content may be useful in diagnosing and fixing a problem.

If the call content was requested (block 914), the example call constructor 408 provides the signaling (e.g., SIP) data for the call and the corresponding RTP data for the selected call(s) to the requester (block 916). To provide the RTP data for a call, the example call constructor 408 accesses the packet capture files referenced by the index records obtained from the query of the packet database 124. For example, the call constructor 408 may access an index record corresponding to a query result, identify the filename information that identifies the location of the packet capture file, and access the packet capture file from the Calls Table 132.

If the call content was not requested (e.g., only the signaling information is requested) (block 914), the example call constructor 408 provides the signaling (e.g., SIP) data to the requester (block 918).

After providing the signaling data (block 918), providing both the signaling and call content (block 916), or if no calls are selected from the query results (block 910), the example instructions 900 of FIG. 9 end. The example instructions 900 may then be repeated for subsequent search requests for the packet database 124.

Figure 10:
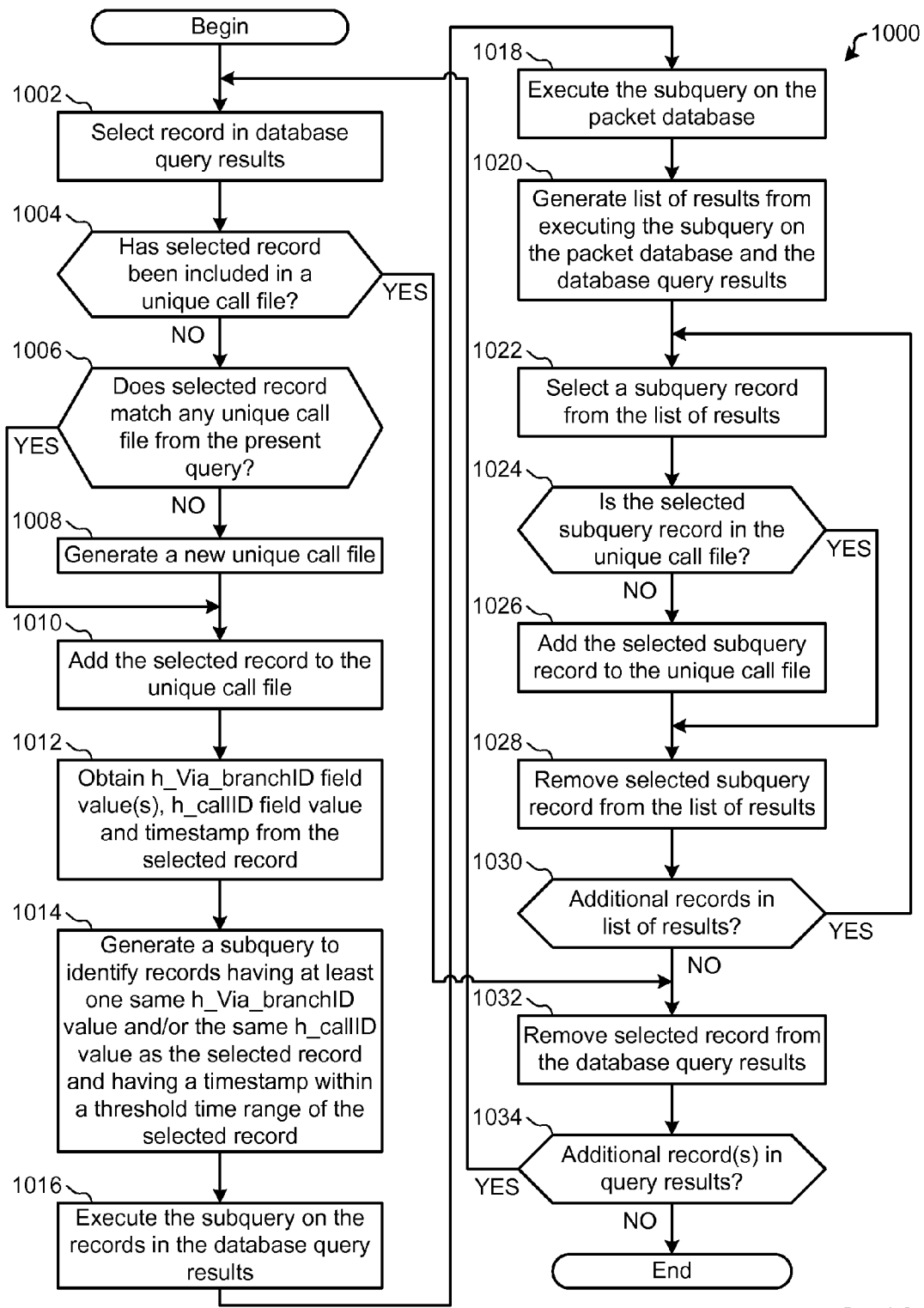
FIG. 10 is a flowchart representative of example machine readable instructions which may be executed by the example query result analyzer of FIG. 4 to match query results into unique calls.

FIG. 10 is a flowchart representative of example machine readable instructions 1000 which may be executed by the example query result analyzer 406 of FIG. 4 to match query results into unique calls. The example instructions 1000 may be performed by the example query generator 404, the example query result analyzer 406, and/or the example call constructor 408 of FIG. 4 to implement block 907 of FIG. 9. In the example described below, a query has been executed on the packet database 124 (e.g., on the Calls Table 132) and a set of database query results has been returned to the query results analyzer 406 (e.g., block 906 of FIG. 9).

The example query results analyzer 406 selects a record from the database query results (block 1002). The selected record is a record in the Index Table 130 and includes the example fields 502-542 of FIG. 5, including a unique identifier (e.g., the id field 502) of the record.

The example call constructor 408 determines whether the selected record has been included in a unique call file (block 1004). The unique call file(s) are call file(s) to be returned to a requester as query results. The unique call files may be selected by the requester to include signaling-only or signaling and voice data.

If the selected record has not been included in a unique call file (block 1004), the example query results analyzer 406 determines whether the selected record matches any unique call file(s) from the present database query (block 1006). If the selected record does not match any of the unique call files from the present database query (block 1006), the example call constructor 408 generates a new unique call file (block 1008).

After generating a new unique call file (block 1008), or if the selected record matches of the unique call files from the present database query (block 1006), the example call constructor 408 adds the selected record to the unique call file (block 1010). For example, if the selected record matches an existing unique call file (block 1006), the call constructor 408 adds the selected record to that existing unique call file. Conversely, if the call constructor 408 generates a new unique call file (block 1008), the example call constructor 408 adds the selected record to the newly-generated generated unique call file.

The example query result analyzer 406 obtains the h_Via_branchID field value(s), the h_callID field value, and/or the timestamp from the selected record (block 1012).

For example, the query result analyzer 406 may obtain the h_Via_branchID field value(s) from the h_Via1_branchID field 534, the h_Via2_branchID field 536, and/or the h_Via3_branchID field 538 of FIG. 5. The query result analyzer 406 may obtain the h_callID field value from the h_callID field 520 of FIG. 5. The query result analyzer 406 may obtain the timestamp from the timestamp field 542 of FIG. 5.

The query generator 404 generates a subquery to identify records having at least one same h_Via_branchID field value and/or a same h_callID field value as the selected record and having a timestamp within a threshold time range of the selected record (block 1014). For example, the query generator 404 generates a query specifying one or more of the h_Via_branchID field value(s) obtained from the selected record, the h_callID field value obtained from the selected record, and/or a range of time determined based on the timestamp obtained from the selected record. The subquery identifies records belonging to a same unique call in the communication network because records that have the same h_Via_branchID field value(s) and/or h_callID field values and that fall within the same time frame are likely to originate from the same call.

The example query generator 404 executes the subquery on the records in the database query results (block 1016). For example, the query generator 404 executes the query to identify the subset of the database query results that match the selected record based on the h_Via_branchID field values, the h_callID field value, and/or the time range determined from the timestamp.

The example query generator 404 also executes the subquery on the packet database 124 (block 1018). For example, the query generator 404 executes the subquery to identify any packets that may not have been identified in the original query (e.g., the query performed at block 906 of FIG. 9 prior to execution of the instructions 1000) but that might be part of the same unique call as the selected record.

The example query result analyzer 406 generates a list of results from the executing the subquery on the packet database 124 and on the database query results (block 1020). For example the query result analyzer 406 may combine the results from executing the subquery on the packet database 124 and the database query results. In some examples, the query result analyzer 406 de-duplicates records in the list of results by identifying duplicates in the id fields 502 of the records in the list of results. Additionally or alternatively, the example query result analyzer 406 may de-duplicate the list of results with the unique call file associated with the selected record by comparing the id fields 502 of the records with the id fields 502 of the records in the unique call file.

The example call constructor 408 selects a subquery record (e.g., a record from the list of results of the subquery generated in block 1020) (block 1022). The call constructor 408 determines whether the selected subquery record is already included in the unique call file associated with the selected record (block 1024). For example, the call constructor 408 may determine whether the id field value of the selected subquery record matches the id field value of any of the records in the unique call file.

If the selected subquery record is not included in the unique call file associated with the selected record (block 1024), the example call constructor 408 adds the selected subquery record to the unique call file (block 1026). After adding the selected subquery record to the unique call file (block 1026), or if the selected subquery record is already included in the unique call file associated with the selected record (block 1024), the example call constructor 408 removes the selected subquery record from the list of results (block 1028).

The example call constructor 408 determines whether there are additional records in the list of results (block 1030). If there are additional records in the list of results (block 1030), control returns to block 1022 to select another subquery record from the list of results.

When there are no additional records in the list of results (block 1030), or if the selected record has been included in a unique call file (block 1004), the example query result analyzer 406 remove the selected record from the database query results (block 1032). The example query result analyzer 406 determine whether there are additional record(s) in the database query results (block 1034). If there are additional record(s) in the database query results (block 1034), control returns to block 1002 to select another record from the database query results. When there are no more record(s) in the database query results (block 1034), the example instructions 1000 end and control returns to a calling procedure, such as block 907 of FIG. 9.

Figure 11:
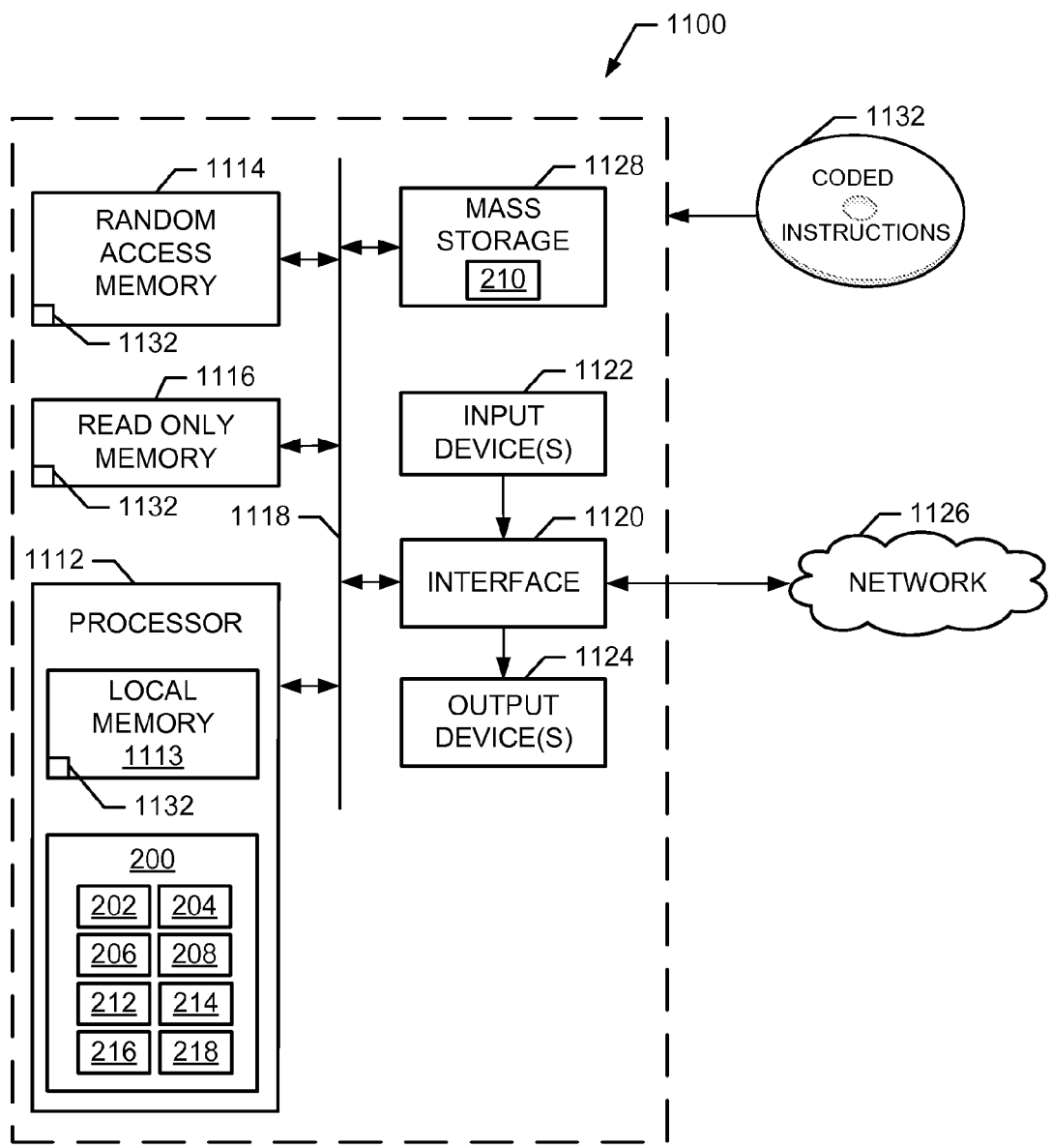
FIG. 11 is a block diagram of an example processor platform capable of executing the instructions of FIG. 7 to implement the apparatus of FIGS. 1 and/or 2.

FIG. 11 is a block diagram of an example processor platform 1100 capable of executing the instructions of FIG. 7 to implement the example packet buffer 202, the example packet data extractor 204, the example packet data analyzer 206, the example packet timestamper 208, the example packet storage 210, the example packet packager 212, the example packet de-duplicator 214, the example package compressor 216, the example package encrypter 218 and/or, more generally, the example packet collectors 116-120 and 200 of FIGS. 1 and/or 2. The processor platform 1100 can be, for example, a server, a personal computer, a routing device, a network node, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The example processor 1112 of FIG. 11 executes the instructions of FIG. 7 to implement the example packet buffer 202, the example packet data extractor 204, the example packet data analyzer 206, the example packet timestamper 208, the example packet storage 210, the example packet packager 212, the example packet de-duplicator 214, the example package compressor 216, the example package encrypter 218 and/or, more generally, the example packet collectors 116-120 and 200 of FIGS. 1 and/or 2.

The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. The example mass storage device 1128 implements the packet storage 210 of FIG. 2. Examples of such mass storage devices 1128 include floppy disk drives, hard drive disks, compact disk drives, Blu-ray disk drives, RAID systems, and digital versatile disk (DVD) drives.

The coded instructions 1132 of FIG. 7 may be stored in the mass storage device 1128, in the volatile memory 1114, in the non-volatile memory 1116, and/or on a removable tangible computer readable storage medium such as a CD or DVD.

Figure 12:
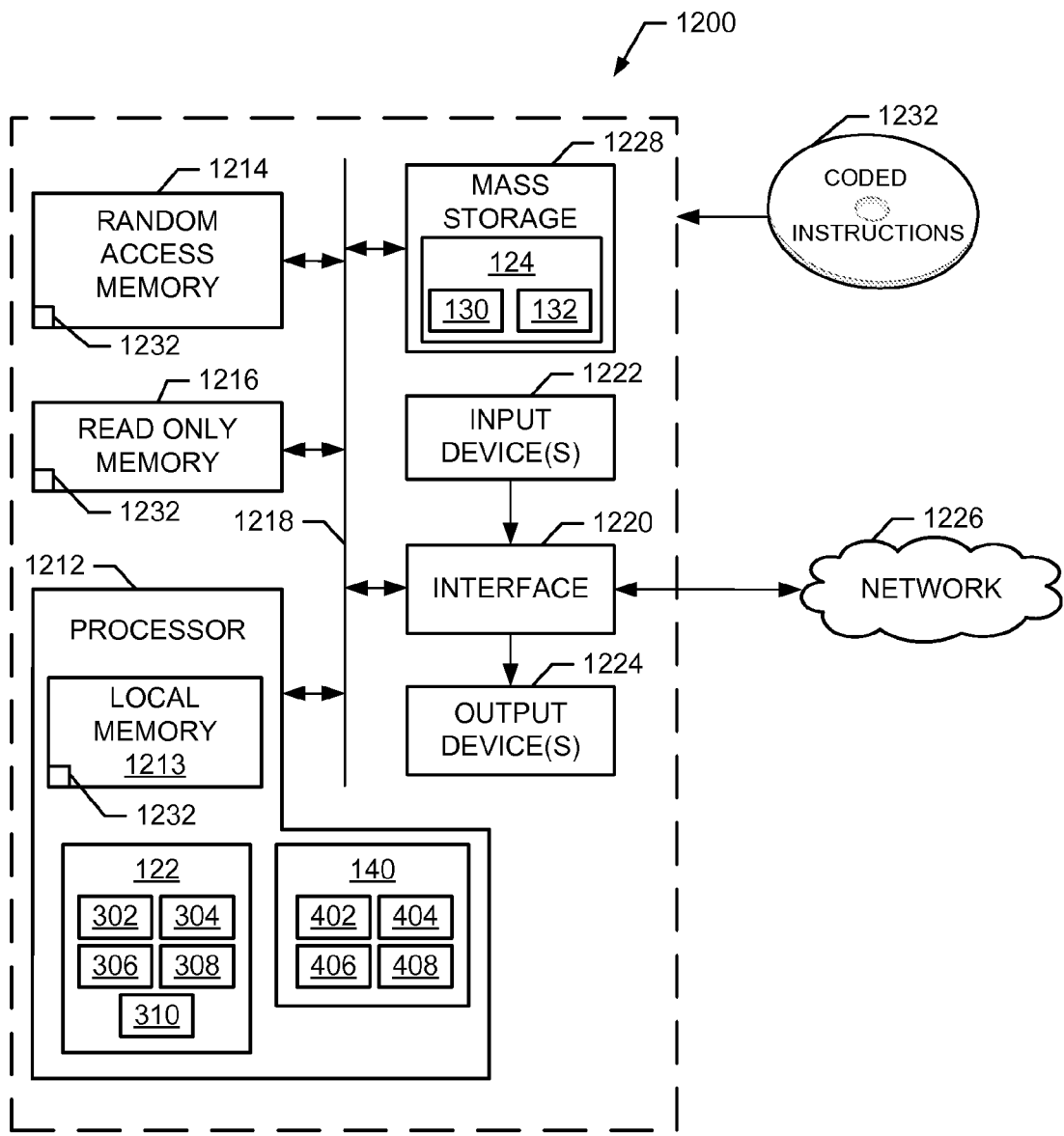
FIG. 12 is a block diagram of an example processor platform capable of executing the instructions of FIGS. 8, 9, and 10 to implement the apparatus of FIGS. 1, 3, and/or 4.

FIG. 12 is a block diagram of an example processor platform 1200 capable of executing the instructions of FIGS. 8, 9, and/or 10 to implement the example package decrypter 302, the example package decompressor 304, the example packet data identifier 306, the example packet indexer 308, the example packet linker 310, the example request parser 402, the example query generator 404, the example query result analyzer 406, the example call constructor 408 and/or, more generally, the example packet processor 122, and/or the example query processor 140 of FIGS. 1, 3, and/or 4. The processor platform 1200 can be, for example, a server, a personal computer, a routing device, a network node, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The example processor 1212 of FIG. 12 executes the instructions of FIGS. 8, 9, and/or 10 to implement the example package decrypter 302, the example package decompressor 304, the example packet data identifier 306, the example packet indexer 308, the example packet linker 310, the example request parser 402, the example query generator 404, the example query result analyzer 406, the example call constructor 408 and/or, more generally, the example packet processor 122, and/or the example query processor 140 of FIGS. 1, 3, and/or 4.

The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. The example mass storage device 1228 implements the packet database 124, the example Index Table 130, and/or the example Calls Table 132 of FIG. 1. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 8, 9, and/or 10 may be stored in the mass storage device 1228, in the volatile memory 1214, in the non-volatile memory 1216, and/or on a removable tangible computer readable storage medium such as a CD or DVD.

From the foregoing, it will be appreciated that methods, apparatus and articles of manufacture have been disclosed which enhance the operations of a computer to provide call information to a requester. In some examples, computer operations can be made more efficient by reducing the number of requests for call information that must be made for the requester to successfully retrieve all of the signaling and/or content associated with a call, by constructing different components and/or legs of the call that may not be located by a first request. In some examples, network communications can be made more efficient by reducing the communications required between a requester, a query processor, and a packet database to provide whole call files using the call construction methods disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to process packets collected from a communications network including network nodes, comprising: in response to a user query including information describing a voice call, performing, by executing an instruction with a query processor, a first search of extracted data stored in a database using a first set of search terms to identify records matching the information, the extracted data representing voice calls in the communication network and being extracted from packets captured at nodes in the communication network, and the packets including control information and voice data; in response to determining that a first record in the database matches the information based on the first search, analyzing, by executing an instruction with an analyzer processor, the first record to identify a second set of search terms, at least some of the second set of search terms being identified using the first record, the second set of search terms being selected to identify a second record in the database as belonging to a same unique call as the first record in the database; performing, by executing an instruction with the at least one of the query processor and the analyzer processor, a second search of the same extracted data in the database using the second set of search terms, the second search to identify the second record based on determining that first metadata of the first record matches second metadata of the second record; and returning, by executing an instruction with the at least one of the query processor and the analyzer processor, a first packet corresponding to the first record, a second packet corresponding to the second record, and a third packet including voice data corresponding to the unique voice call in response to the user query.

2. The method defined in claim 1, wherein the information describing the voice call includes a first identifier of a called party in the unique voice call, a second identifier of a calling party in the unique voice call, and a time range of the unique voice call.

3. The method defined in claim 1, wherein the extracted data includes at least one of a first branch identifier, a first unique call identifier, and a first timestamp.

4. The method defined in claim 3, wherein the identifying of the second record in the database as belonging to the unique voice call includes a) determining that a difference between the first timestamp and a second timestamp satisfies a threshold and b) at least one of i) matching the first branch identifier corresponding to the first packet to a second branch identifier corresponding to the second packet and ii) matching the first unique call identifier to a second unique call identifier corresponding to the second packet.

5. The method defined in claim 1, further including storing the extracted data in the database, the storing of the extracted data in the database to include:

generating an index record to include the extracted data;
including in the index record an identifier of a file containing voice data corresponding to the extracted data;
storing the index record in the database; and
storing the file in the database.

6. The method defined in claim 1, further including retrieving from the database voice packets that are identified in all records determined to correspond to the unique voice call in response to the query.

7. An apparatus to process packets in a communication network including network nodes, the apparatus comprising: a query processor; an analyzer processor; and a non-transitory computer readable storage medium including computer readable instructions which, when executed by the at least one of the query processor and the analyzer processor, cause the at least one of the query processor and the analyzer processor to perform operations including: in response to a user query including information describing a voice call, performing a first search of extracted data stored in a database using a first set of search terms to identify records matching the information, the extracted data being extracted from packets captured at nodes in a communication network, the extracted data including data representative of voice calls in the communication network, and the captured packets including control information and voice data; in response to determining that a first record in the database matches the information based on the first search, performing a second search of the same extracted data in the database using a second set of search terms, the second search to identify a second record in the database as belonging to a same unique voice call as the first record in the database based on determining that first metadata of the first record matches second metadata of the second record, at least some of the second set of search terms being identified based on information contained in the first record; and returning a first packet corresponding to the first record, a second packet corresponding to the second record, and a third packet including voice data corresponding to the unique voice call in response to the user query.

8. The apparatus defined in claim 7, wherein the information describing the voice call includes a first identifier of a called party in the unique voice call, a second identifier of a calling party in the unique voice call, and a time range of the unique voice call.

9. The apparatus defined in claim 7, wherein the extracted data includes at least one of a first branch identifier, a first unique call identifier, and a first timestamp.

10. The apparatus defined in claim 9, wherein the instructions are to cause the processor to identify the second record in the database as belonging to the unique voice call by:
 a) determining that a difference between the first timestamp and a second timestamp satisfies a threshold; and
 b) at least one of: i) matching the first branch identifier corresponding to the first packet to a second branch identifier corresponding to the second packet and ii) matching the first unique call identifier to a second unique call identifier corresponding to the second packet.

11. The apparatus defined in claim 7, wherein the instructions are further to cause the processor to store the extracted data in the database by:
generating an index record to include the extracted data;
including in the index record an identifier of a file containing voice data corresponding to the extracted data;
storing the index record in the database; and
storing the file in the database.

12. The apparatus defined in claim 7, wherein the instructions are further to cause the processor to retrieve from the database voice packets that are identified in all records determined to correspond to the unique voice call in response to the query.

13. A non-transitory computer readable storage medium comprising computer readable instructions which, when executed by at least one of a query processor and an analyzer processor, cause the at least one of the query processor and the analyzer processor to perform operations including: in response to a user query including information describing a voice call, performing a first search of extracted data stored in a database using a first set of search terms to identify records matching the information, the extracted data being extracted from packets captured at nodes in a communication network, the extracted data including data representative of voice calls in the communication network, and the captured packets including control information and voice data; in response to determining that a first record in the database matches the information based on the first search, performing a second search of the same extracted data in the database using a second set of search terms, the second search to identify a second record in the database as belonging to a same unique voice call as the first record in the database based on determining that first metadata of the first record matches second metadata of the second record, at least some of the second set of search terms being identified using the first record; and returning a first packet corresponding to the first record, a second packet corresponding to the second record, and a third packet including voice data corresponding to the unique voice call in response to the user query.

14. The storage medium defined in claim 13, wherein the information describing the voice call includes a first identifier of a called party in the unique voice call, a second identifier of a calling party in the unique voice call, and a time range of the unique voice call.

15. The storage medium defined in claim 13, wherein the information describing the voice call includes a first identifier of a called party in the unique voice call, a second identifier of a calling party in the unique voice call, and a time range of the unique voice call.

16. The storage medium defined in claim 15, wherein the instructions are to cause the processor to identify the second record in the database as belonging to the unique voice call by:
 a) determining that a difference between the first timestamp and a second timestamp satisfies a threshold; and
 b) at least one of: i) matching the first branch identifier corresponding to the first packet to a second branch identifier corresponding to the second packet and ii) matching the first unique call identifier to a second unique call identifier corresponding to the second packet.

17. The storage medium defined in claim 13, wherein the instructions are further to cause the processor to retrieve from the database voice packets that are identified in all records determined to correspond to the unique voice call in response to the query.

18. The method defined in claim 1, wherein the query processor and the analyzer processor are a same processor.

19. The apparatus defined in claim 7, wherein the query processor and the analyzer processor are a same processor.

20. The storage medium defined in claim 13, wherein the query processor and the analyzer processor are a same processor.

* * * * *